United States Patent [19]

Rhodes

[11] 4,042,868
[45] Aug. 16, 1977

[54] STEPPER MOTOR CONTROL APPARATUS

[75] Inventor: Melvin H. Rhodes, Cedar Rapids, Iowa

[73] Assignee: Rockwell International Corporation, El Segundo, Calif.

[21] Appl. No.: 615,754

[22] Filed: Sept. 22, 1975

[51] Int. Cl.² ............................................. G05B 5/01
[52] U.S. Cl. .................................. 318/615; 318/620; 318/685
[58] Field of Search ............... 318/561, 615, 616, 617, 318/620, 685

[56] References Cited

U.S. PATENT DOCUMENTS

| | | | |
|---|---|---|---|
| 3,241,015 | 3/1966 | Allen | 318/617 |
| 3,273,035 | 9/1966 | Inderhees | 318/615 |
| 3,412,300 | 11/1968 | Westenskow | 318/561 |
| 3,448,362 | 6/1969 | Dorf et al. | 318/561 |
| 3,777,122 | 12/1973 | Borsboom | 318/615 |
| 3,805,137 | 4/1974 | Fahrner | 318/636 |

Primary Examiner—Robert K. Schaefer
Assistant Examiner—John J. Feldhaus
Attorney, Agent, or Firm—Robert J. Crawford; Bruce C. Lutz

[57] ABSTRACT

A control system using a duty cycle converter to convert an analog input into both a second order or velocity squared feedback as well as a set of clockwise and counterclockwise pulse trains the frequency of which is dependent upon the amplitude of the input signal. The velocity squared feedback is augmented by a position feedback from a stepper motor to provide optimum operation. To obtain optimum performance from a stepper motor, the rate of change of input pulses must not exceed a predetermined value for starting or stopping or the motor will react improperly to some of the pulses. The present system provides a linear increase in the step rate to a maximum and then a linear decrease in the step rate such that there is no overshoot beyond the requested analog input signal.

6 Claims, 3 Drawing Figures

STEPPER MOTOR CONTROL APPARATUS

THE INVENTION

The present invention is generally concerned with electronics and more specifically concerned with a system for controlling a stepper motor.

A stepper motor can run at a step rate that far exceeds the step rate at which they can start or stop. Thus, it is most desirable that the step rate start at a low value and increase to a maximum before decreasing the step rate as the system comes to rest.

Prior art systems have either limited the step rate to a value at which the stepper motor never misses the full advancement in response to a step pulse or else have disregarded the errors that are involved when a stepper motor cannot adequately respond in position change to a given input pulse.

The present system provides a linear increase in pulse and resulting step rate and a linear decrease in the pulse and resulting step rate. This linear change is accomplished by summing an analog command signal with an analog position feedback signal from the motor along with an analog signal which is proportional to the square of the step rate of the stepper motor. The sum of these signals is limited to a given maximum amount before being integrated. The integrated value is then used to actuate a duty cycle converter whose outputs are used both to provide stepping pulses to the motor at a frequency dependent upon the amplitude of the input and to provide a feedback signal indicative of the square of the input signal. As designed, the output of the integrator is proportional to velocity, thus, the output from the converter is proportional to the square of the velocity. Using this squared signal instead of a signal proportional directly to velocity, a system is achieved where the deceleration is constant as the position error goes to zero and overshoot is eliminated.

It is, thus, an object of the present invention to provide an improved stepper motor control system.

Other objects and advantages will be apparent from a reading of the specification and appended claims in conjunction with the drawings, wherein:

DETAILED DESCRIPTION

Figure 1:
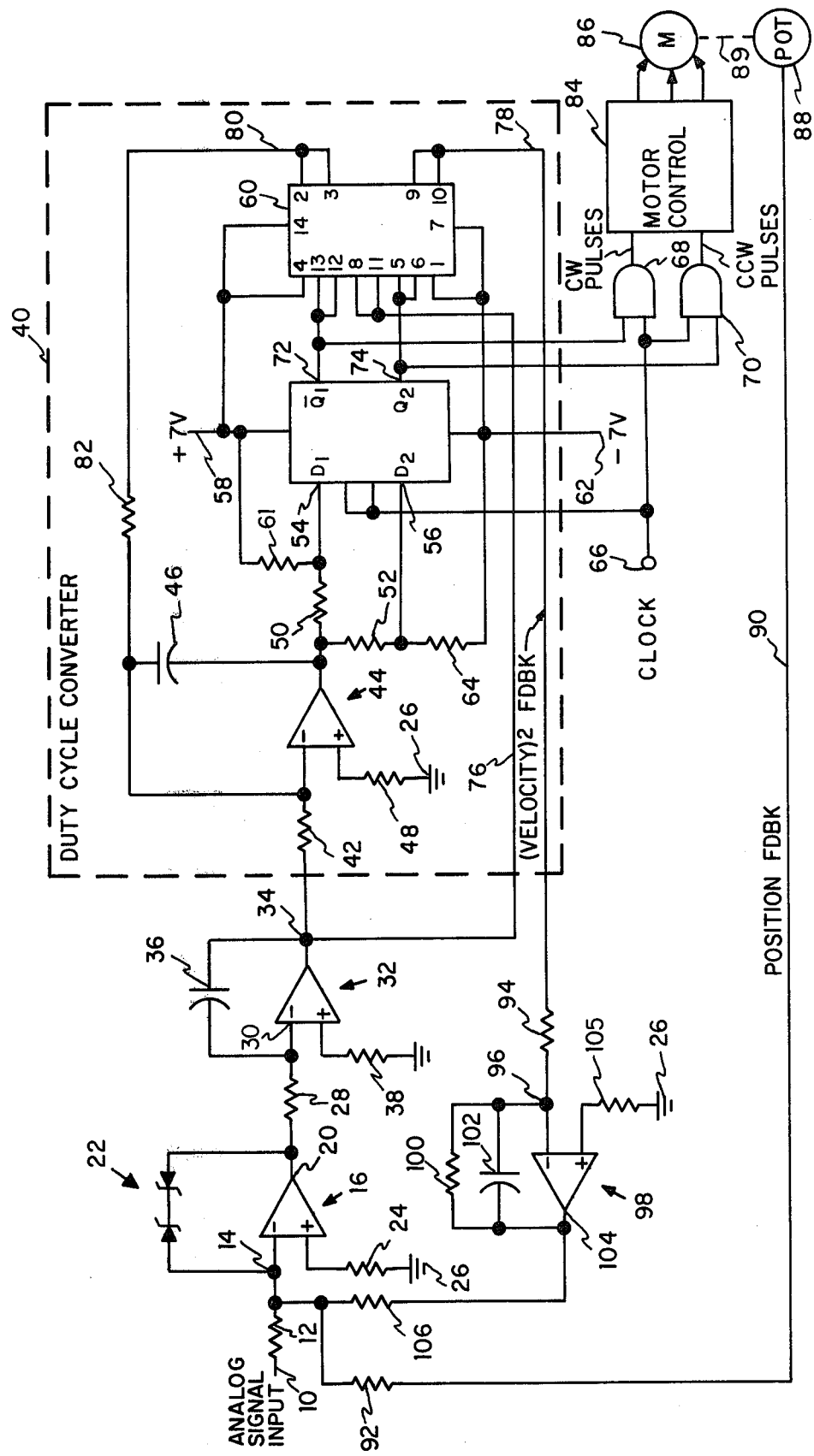
FIG. 1 is a block schematic diagram of a first preferred embodiment of the invention.

In FIG. 1, an analog signal input 10 is connected through a resistor 12 to a first input 14 of a differential amplifier 16 at the inverting input thereof. A pair of zener diodes generally designated as 22 are connected between an output 20 of amplifier 16 and input 14. A resistor 24 is connected between ground or reference potential 26 and a non-inverting or positive input to amplifier 16. A resistor 28 is connected between output 20 of amplifier 16 and an inverting input 30 of a further differential amplifier 32 having an output 34. A capacitor 36 is connected between output 34 and input 30. A resistor 38 is connected between ground 26 and a further non-inverting input of amplifier 32. It will be noted as illustrated, amplifier 16 along with diodes 22, form a limiting device for preventing more than a predetermined change in step rate from the attached step motor. The amplifier 32 in combination with feedback capacitor 36 forms an integrator such that the output is an integration of the total signals received at input 30 over a period of time.

Apparatus within a dash line block generally designated as 40 constitutes the subject matter of my U.S. Pat. No. 4,005,284 issued Jan. 25, 1977. The disclosure of this referenced patent forms a part of the disclosure of the present application. However, a brief description will be provided as to the duty cycle converter contained within dash line block 40. A resistor 42 is connected to an input of the converter and to the output 34 of amplifier 32. The other end of resistor 42 is connected to an inverting input of an integrating amplifier 44 having a feedback capacitor 46. A resistor 48 is connected between ground 26 and a non-inverting input of amplifier 44. The output from amplifier 44 is divided between two resistors 50 and 52 and applied to inputs 54 and 56 of a dual D flip-flop which may be similar to the sold to RCA under Part Number CD4013A. A positive power supply 58 supplies current through a resistor 61 to form a voltage dividing network in conjunction with resistor 50. Power supply 58 also supplies current directly to the dual D converter as well as supplying power to a set of switches 60. This set of switches 60 may be similar to that sold by RCA under Part Number CD4016A. Block 60 contains four switches wherein inputs 4, 8, 11 and 1 are connected respectively to 3, 9, 10 and 2 upon application of control signals to 13, 6, 12 and 5, respectively. The power supply 58 also supplies a reference potential to the block 60 for use in the feedback portion thereof. A negative power terminal 62 supplies current directly to the dual D converter and to block 60 as well as supplying signals through a resistor 64 to form a portion of a voltage dividing network with resistor 52. A clock signal input on a terminal 66 is supplied to clock inputs of the dual D flip-flop as well as being supplied to one input of each of two AND gates 68 and 70. An output Q1 designated as 72 supplies a signal to the other input of AND gate 68 as well as to two inputs of block 60. These two inputs are control inputs for two of the switches within block 60. The Q2 output of the dual D flip-flop designated as 74 is connected to the other input of AND gate 70 as well as being connected to two further switch control inputs of block 60. Output 34 from amplifier 32 is connected to two further switch inputs of block 60 wherein the output 72 connects a lead 76 to a lead 78 when 72 is a logic 1 and 74 accomplishes the same end result when it is a logic 1. A further output of block 60 is illustrated on lead 80 and passes signals through resistor 82 to the inverting input of amplifier 44. Actuation of the output 72 to a logic 1 condition will connect lead 80 to the positive power supply 58 while actuation of the switch within block 60 by output 74 becoming a logic 1 will connect lead 80 to receive its signals from negative power supply designated as 62. An output of AND gate 68 produces one input to a motor controller 84 which may be of the type sold by IMC Magnetics Corporation under the designation Model 0128 15 3312-01. An output from AND gate 70 produces a second input to the motor controller 84. As illustrated, a stepper motor designated as 86 will have three-phase inputs and the motor controller 84 will provide a first phase sequence upon receiving inputs from AND gate 68 and will provide the other phase sequence upon receiving inputs from AND gate 70. A potentiometer or other position feedback detector 88 is connected by mechanical linkage 90 to ascertain the position of stepper motor 86. An output is supplied on a lead 90 through a resistor 92 to the input 14 of amplifier 16. The lead 78 is connected through a resistor 94 to a first inverting input 96 of a smoothing filter amplifier generally designated as 98. A resistor 100 and a capacitor 102 are connected in parallel between input 96 and an output 104 of amplifier 98. A resistor 106 is connected between 26 and a non-inverting input of amplifier 98. Output 104 is connected through a resistor 106 to input 14.

Figure 2:
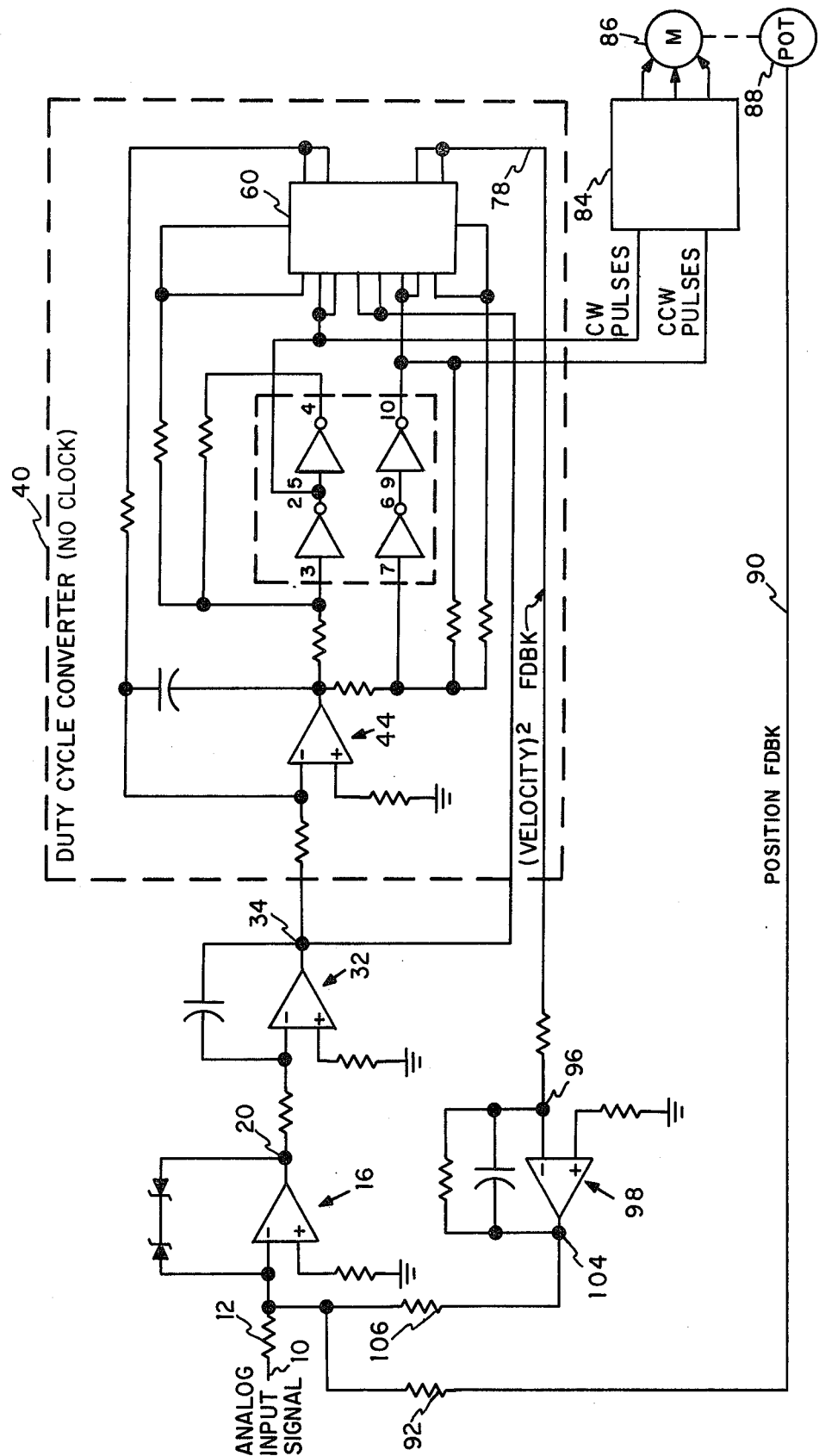
FIG. 2 is a second block schematic diagram of a second preferred embodiment of the invention.

FIG. 2 is substantially identical with that of FIG. 1 with the sole exception that the duty cycle converter is designed such that it does not require clock pulses and thus the AND gates 68 and 70 are not required in the stepping motor controller. Since the duty cycle converter of FIG. 2 is also illustrated in the referenced co-pending application C-7136, no further discussion is believed necessary and only the major portions of FIG. 2 have been numbered with the same numbers being used as are used in FIG. 1.

Figure 3:
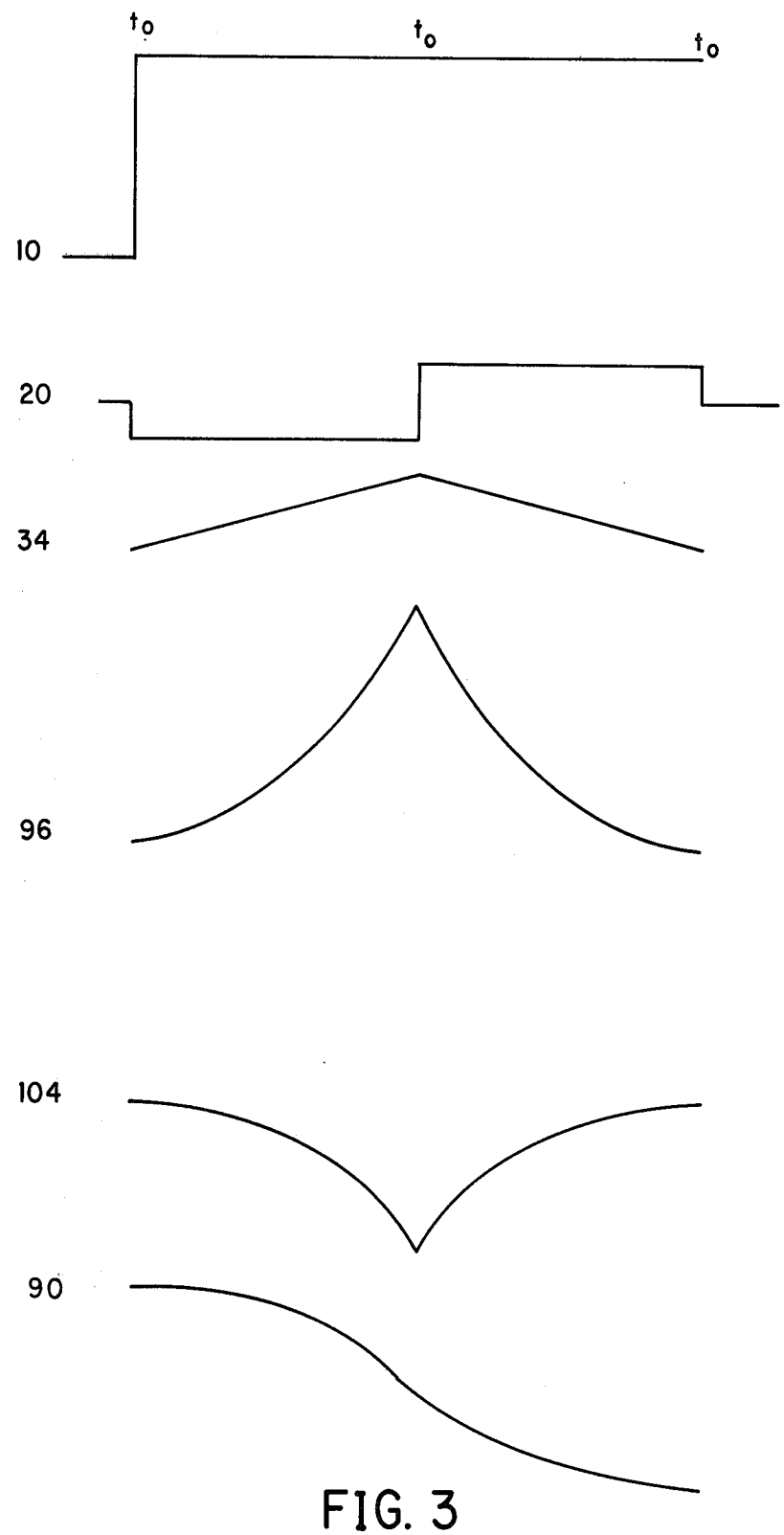
FIG. 3 is a set of waveforms describing the operation of both of the circuits of FIGS. 1 and 2.

In FIG. 3, the waveforms correspond in number designation to the points illustrated in FIGS. 1 and 2 and will be used in the Description of Operation.

OPERATION

As may be ascertained from reading the referenced co-pending application, the duty cycle converter 40 provides a switching operation to the set of switches 60 which switches are operated at a pulse density or frequency in correspondence to or representative of the amplitude signals applied to input 42. The signal applied on lead 76 is indicative also of the amplitude of the input signal. If it is then output as a controlling amplitude at a frequency or pulse repetition in conjunction with its input, the resultant signal appearing on lead 78 will be representative of that amplitude times a pulse density representative of that amplitude and thus will be indicative of the signal on lead 76 times itself, or in other words, will be a squared function. As illustrated in FIG. 3, the signal at point 34 is a triangular function and is a result of the integration of the input illustrated on waveform 20. The multiplication of a triangular waveform times itself results in a waveform as illustrated in 96 or its inverse as illustrated in 104. In actuality, the waveform 96 is merely representative of a series of pulses slowly increasing in value and is not truly representative of the signal appearing at input 96. However, the amplifier 98 and its accompanying resistor and capacitor 100 and 102, respectively, perform a smoothing function such that the pulses represented by waveform 96 are smoothed out and waveform 104, as inverted by amplifier 98, is truly representative of the signal obtained. Waveform 90 is merely indicative of the position of motor 86 with respect to a reference point at time $T_o$.

If at time $T_o$, the input on 10 is suddenly increased or altered to a different value, this signal will be reflected through amplifier 16 to an output signal of the opposite polarity. With the high gain obtained and the limiting by diodes 22, the output signal will appear as a much smaller signal at output 20. This output will be integrated by amplifier 32 to obtain the waveform 34. With the action above-described in duty cycle converter 40, a feedback signal will appear on 78 which is smoothed by amplifier 98 to obtain a squared function at output 104 which is fed back to amplifier 16. As previously mentioned, the output of limiter 16 restricts the amplitude of the signal being integrated by amplifier 32. The velocity of stepper motor 86 is directly proportional to the signal output of intergrator 32. This will be apparent since the motor is driven by pulses the frequency or density of which is dependent upon the amplitude of the signal appearing on 34. Thus, the squared signal on lead 78 is proportional to the velocity squared. Since deceleration is also constant, a proper assignment of values to resistors 12, 92 and 106 will produce a system where the position error as illustrated in 90 will go to a zero difference with respect to signal 10 without overshoot.

While I have shown and described a preferred embodiment of my inventive concept using two types of duty cycle converters for providing the constant acceleration and deceleration as well as providing a velocity squared feedback, I wish to be limited not by the specific embodiment illustrated, but only by the scope of the appended claims describing a stepper motor control system as claimed.

What is claimed is:

1. Apparatus for controlling a position indicating motor means comprising, in combination:
   limiting means, including input means and output means;
   first signal supplying means for supplying a control signal connected to said input means of limiting means;
   integrating means, including input means and output means, said input means thereof connected to said output means of said limiting means;
   signal converting means, including input means and first, second and third output means, a signal appearing at said first output means being representative of the square of a signal being supplied to said input means thereof and pulse signals appearing at said second and third output means being representative in frequency of the amplitude of the signal being supplied to said input means thereof and respectively representing the polarity of the signal being supplied to said input means thereof;
   means connecting said output means of said integrating means to said input means of said signal converting means;
   motor means including input means connected to said second and third output means of said signal converting means, said motor means being actuated a prescribed amount upon receipt of each pulse and in a direction corresponding to which of said second and third means is supplying pulse signals;
   position feedback signal means connected to said motor means and supplying a signal indicative of the position of said motor means with respect to a reference; and
   summing means for summing signals from said position feedback signal means and said first output means of signal converting means to said input means of said limiting means.

2. Apparatus as claimed in claim 1 wherein:
   said motor means is a stepping motor; and
   said signal appearing at said first output means of said signal converting means is a feedback signal indicative of velocity squared.

3. Apparatus as claimed in claim 1 wherein said signal converting means comprises, in combination:
   first switch means including first and second gating means each having an input means, an output means and a control means for controlling a conductive path between said input means and said output means of the gating means;
   first and second feedback signal source means connected to said input means of said first and second gating means respectively of said first switch means;

second integrating means including input means and output means;

means connecting said input means of said signal converting means and said output means of said first switch means to said input means of said second integrating means;

voltage sensitive second switch means including input means and first and second output means, said second switch means providing a given polarity output at said first output means thereof when a signal at said input means thereof exceeds a first polarity reference level and the second output means thereof providing an output signal of said given polarity when a signal provided to said input exceeds a polarity second reference level;

means connecting said output means of said second integrating means to said input means of said second switch means;

means connecting said first and second output means of said second switch means to said control means of said first and second gating means respectively of said first switch means, the output signal from said first output means of said voltage sensitive switch means being representative in duty cycle of the amplitude of positive signals provided by said analog signal supplying means and the output signal at said second output means of said second switch means being representative in duty cycle of the amplitude of negative signals supplied by said analog signal supplying means; and means connecting said first and second output means of said second switch means to said second and third output means of said signal converting means.

4. Apparatus as claimed in claim 3 wherein said signal converting means additionally includes:

third switch means including third and fourth gating means each having an input means, an output means and a control means for controlling a conductive path between said input means and said output means of said gating means;

means connecting said input means of said signal converting means to said input means of said first and second gating means;

means connecting said output means of said first and second gating means to said first output means of said signal converting means; and means connecting said first and second output means of said second switch means to said control means of said third and fourth gating means respectively.

5. Servo-mechanism apparatus comprising, in combination:

summing means including first, second and third input means and output means for supplying a composite output signal which is a function of signals supplied to said inputs;

control signal supplying means for supplying an analog position control signal to said first input means;

first signal converting means connected between said output means and said second input means for supplying thereto a signal indicative of the square of said composite signal; and second signal converting means, including signal responsive motor means and position indicating means, connected between said output means and said third input means, said motor means responding to said composite signal from said summing means and said position indicating means providing a position output signal to said third input means which changes in response to actuation of said motor means.

6. Servo-mechanism apparatus comprising, in combination:

summing means including first, second and third input means and output means for supplying a composite output signal which is a function of signals supplied to said inputs;

control signal supplying means for supplying an analog position control signal to said first input means; and signal converting means connected between said output means and said second input means for supplying thereto a first signal indicative of the square of said composite signal, and including signal responsive motor means and position indicating means, connected to said third input means, said motor means responding to said composite signal from said summing means and said position indicating means providing a position output second signal to said third means which changes in response to actuation of said motor means.

* * * * *